3,058,953
VINYLBENZYLHALOPHENYLETHER AND POLYMERS AND METHOD OF MAKING THE SAME

Elmer L. McMaster, Midland, Mich., assignor to The Dow Chemical Company, Midland, Mich., a corporation of Delaware
No Drawing. Filed May 27, 1959, Ser. No. 816,083
12 Claims. (Cl. 260—47)

This invention relates to certain new unsaturated, halogenated ethers. Specifically, it relates to mixtures of vinylbenzylhalophenylethers having the formula:

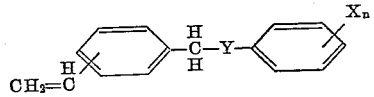

wherein Y is a member of the group consisting of oxygen and sulfur and X is a member of the group consisting of chlorine and bromine and wherein $n$ is an integer from 1 to 5; polymeric bodies containing from about 5 to about 50 weight percent of the recurrent group

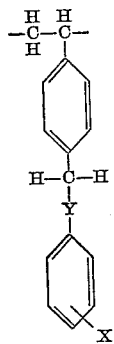

wherein X, Y, and $n$ are as above identified; and to a method of making these new unsaturated halogenated ethers.

The process of the present invention includes reacting a halophenol or benzenethiol with a vinylbenzyl chloride in the presence of aqueous alkali or alkaline earth hydroxide and a polymerization inhibitor such as, for example, dinitro-o-cresol in an organic solvent. Equivalent amounts of reactants are generally used, although the ratio may be varied somewhat, if desired. Organic solvents which are suitable include dioxane, dimethylformamide, and the like. Temperatures from about 50° C. to about 100° C. are generally employed, although higher or lower temperatures may be used. The pressure may be atmospheric or any pressure at which it is convenient to operate. A reaction time of from about one to about 30 hours is generally sufficient to obtain substantial completion of the reaction. The products may be separated in any convenient manner, such as, for example, filtration, solvent extraction, and the like.

The reaction of the present invention may be illustrated by the following equation:

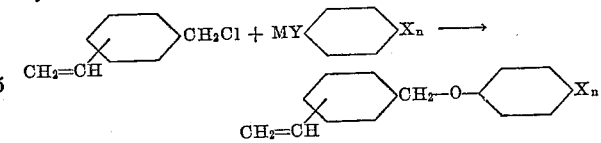

wherein M represents an alkali or alkaline earth metal, Y represents oxygen or sulfur, X represents chlorine or bromine and $n$ is an integer from 1 to 5 inclusive.

The present invention may be further illustrated, but is not to be construed as limited by the following examples.

Example I.—Preparation of o,p-Vinylbenzyl-p-Bromophenylether

A mixture of 86.5 grams (0.5 mole) of p-bromophenol, 20 grams (0.5 mole) of sodium hydroxide, 125 milliliters of water and 500 milliliters of dioxane was prepared and placed in a 1000 milliliter 3-necked flask equipped with a thermowell, stirrer, reflux condenser and dropping funnel and a mixture of 76.3 grams (0.5 mole) of o,p-vinylbenzyl chloride, 0.36 gram of dinitro-o-cresol and 65 milliliters of dioxane was slowly added while stirring. When addition was complete the solution was heated at 90° C. for 5 hours with continued stirring and then let stand overnight. Two layers formed which were separated. The top layer was washed with water and a yellow precipitate formed which was filtered off, washed with dilute sodium hydroxide and then with water, and dried at room temperature. The yield of o,p-vinylbenzyl-p-bromophenylether was 125 grams (86.5 percent) of the theoretical.

In a manner similar to that of Example I other halophenols were reacted with o,p-vinylbenzyl chloride (VBC) to produce new o,p-vinylbenzylhalophenylethers. The results are tabulated in the following table:

TABLE II
o,p-VINYLBENZYL HALOPHENYLETHERS

| Phenol | Moles Phenol | Moles VBC | Product | Melting Point | Percent Yield |
|---|---|---|---|---|---|
| 2,4-dibromophenol | 0.5 | 0.5 | o,p-vinylbenzyl-2,4-dibromophenylether | 55.0 | 92.4 |
| 2,4,6-tribromophenol | 0.4 | 0.4 | o,p - vinylbenzl - 2,4,6 - tribromophenylether | 83.5 | 75.25 |
| Pentabromophenol | 0.4 | 0.4 | o,p-vinylbenzyl-pentabromophenylether | 189.5 | 91.7 |
| Pentachlorobenzenethiol | 0.2 | 0.2 | pentachlorophenyl ar-vinylbenzyl sulfide | 142.0 | 88.4 |
| Pentachlorophenol | 0.4 | 0.5 | o,p-vinylbenzylpentachlorophenylether | 123.5 | 56.5 |

The new o,p-vinylbenzylhalophenylethers are white to tan solid materials which are insoluble in water and soluble in various organic solvents such as, for example, acetone, ethanol, benzene, toluene, o-dichlorobenzene, and the like. They can be polymerized to form new homopolymers or copolymerized with other polymerizable monomers such as styrene, methyl methacrylate, methyl isopropenyl ketone, acrylonitrile, vinyl acetate and the like to yield self-extinguishing resinous products which can be extruded or molded in usual ways employing conventional procedures to form shaped articles such as boxes, plates or plastic tags. They can also be incorporated with other resinous polymers to form compositions useful for making shaped articles, e.g. cups, tags, rings, etc.

Example II.—Polymerization of o,p-Vinylbenzylpentachlorophenylether

Ten grams of o,p-vinylbenzylpentachlorophenyl ether and 0.05 gram of benzoyl peroxide were placed in a 4 dram vial, the vial sealed, and the mixture heated for 20 hours at 110° C. A hard polymer was obtained which was compression molded at 300° F. to give a transparent molding. This polymer was soluble in toluene, xylene, o-dichlorobenzene and the like.

*Example III.—Copolymerization of o,p-Vinylbenzylpentabromophenyl Ether*

A mixture of 92.5 grams of styrene and 7.5 grams of o,p-vinylbenzylpentabromophenyl ether was placed in a 1 inch x 12 inch glass bomb, and the bomb purged with nitrogen, sealed and placed in an oil bath for 68 hours at 114° C. After breaking the bomb, 95 grams of a transparent polymer having a slight yellow-brown color was recovered. The polymer was devolatilized and flash moldings and test bars were made. The solution viscosity of 10 percent polymer in toluene was 23 centipoises. The weight percent ether in the copolymer was 7.4.

In a manner similar to that of Example III other copolymers of styrene were made as shown in the following Table II.

TABLE II

| Monomer | Weight Percent | Polymer Characteristics |
|---|---|---|
| Vinylbenzylpentabromophenylether | 7 | Yellow, Transparent |
| Do | 8 | Do. |
| Do | 5 | Do. |
| Vinylbenzylpentachlorothiolphenylether | | |
| Do | 10 | Do. |
| Do | 20 | Do. |

Various modifications may be made in the present invention without departing from the spirit or scope thereof, and it is understood I limit myself only as defined in the appended claims.

I claim:
1. A composition of matter comprising monomeric vinylbenzylhalophenyl ethers having the formula:

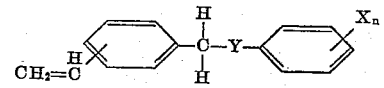

wherein Y is a member of the group consisting of oxygen and sulfur, X is a member of the group consisting of chlorine and bromine and wherein $n$ is an integer from 1 to 5.
2. o,p-Vinylbenzyl-p-bromophenylether.
3. o,p-Vinylbenzyl-2,4-dibromophenylether.
4. o,p-Vinylbenzyl-2,4,6-tribromophenylether.
5. o,p-Vinylbenzylpentabromophenylether.
6. Pentachlorophenyl-ar-vinylbenzyl sulfide.
7. o,p-Vinylbenzylpentachlorophenylether.
8. The homopolymer of o,p-vinylbenzylpentabromophenylether.
9. The homopolymer of o,p-vinylbenzylpentachlorophenylether.
10. A copolymer of styrene and o,p-vinylbenzylpentabromophenylether.
11. A copolymer of styrene and o,p-vinylbenzylpentachlorophenylether.
12. A copolymer of styrene and o,p-vinylbenzylpentachlorothiolphenylether.

References Cited in the file of this patent
UNITED STATES PATENTS

| | | |
|---|---|---|
| 2,233,080 | Hester et al. | Feb. 25, 1941 |
| 2,497,927 | Bruson | Feb. 21, 1950 |
| 2,780,604 | Clarke et al. | Feb. 5, 1957 |
| 2,819,315 | Speeter | Jan. 7, 1958 |
| 2,852,568 | Schmerling | Sept. 16, 1958 |